(12) United States Patent
Xu et al.

(10) Patent No.: US 10,906,236 B2
(45) Date of Patent: Feb. 2, 2021

(54) ARTICLE WITH SOLID, LATTICE, AND HOLLOW SUB-REGIONS

(71) Applicant: Ford Global Technologies, LLC, Dearborn, MI (US)

(72) Inventors: Hongyi Xu, Northville Township, MI (US); David D. Friske, Wolverine Lake, MI (US); Siddharthan Selvasekar, Livermore, CA (US); Ellen Lee, Ann Arbor, MI (US); Ching-Hung Chuang, Northville, MI (US); John Jeffrey Pfeiffer, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 315 days.

(21) Appl. No.: 15/879,852

(22) Filed: Jan. 25, 2018

(65) Prior Publication Data
US 2019/0224910 A1    Jul. 25, 2019

(51) Int. Cl.
| | |
|---|---|
| *B62D 29/00* | (2006.01) |
| *B29C 64/135* | (2017.01) |
| *B22F 3/105* | (2006.01) |
| *B29C 64/153* | (2017.01) |
| *B22F 5/10* | (2006.01) |
| *B32B 5/00* | (2006.01) |
| *B62D 35/00* | (2006.01) |

(Continued)

(52) U.S. Cl.
CPC .......... *B29C 64/135* (2017.08); *B22F 3/1055* (2013.01); *B22F 5/10* (2013.01); *B29C 64/153* (2017.08); *B32B 5/00* (2013.01); *B62D 35/007* (2013.01); *B22F 3/1115* (2013.01); *B29K 2101/12* (2013.01); *B29L 2031/3058* (2013.01); *B33Y 10/00* (2014.12); *B33Y 80/00* (2014.12); *B62D 29/00* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 5,630,093 A | 5/1997 | Holzhammer et al. | |
| 5,775,402 A * | 7/1998 | Sachs ................... | B29C 64/153 164/4.1 |

(Continued)

FOREIGN PATENT DOCUMENTS

| | | |
|---|---|---|
| CN | 104590397 B | 5/2015 |
| DE | 102012016309 A1 | 2/2014 |
| WO | 201692215 A1 | 6/2016 |

OTHER PUBLICATIONS

Grady et al., A Fully Non-Metallic Gas Turbine Engine Enabled by Additive Manufacturing, May 2015 (Year: 2015).*

(Continued)

*Primary Examiner* — David Sample
*Assistant Examiner* — Mary I Omori
(74) *Attorney, Agent, or Firm* — David Coppiellie; Carlson, Gaskey & Olds

(57) ABSTRACT

An article includes a body that has a solid shell that encloses an interior region. The interior region has a solid sub-region, a lattice sub-region, and a hollow sub-region that are exclusive of each other and distributed based on load path. In an example, the article is a spoiler cap, such as for the spoiler on a vehicle.

20 Claims, 3 Drawing Sheets

(51) Int. Cl.
    *B33Y 80/00*     (2015.01)
    *B29L 31/30*     (2006.01)
    *B33Y 10/00*     (2015.01)
    *B29K 101/12*     (2006.01)
    *B22F 3/11*     (2006.01)

(56) References Cited

U.S. PATENT DOCUMENTS

| | | | |
|---|---|---|---|
| 7,252,324 B1* | 8/2007 | Nahm | B29C 49/20 296/180.1 |
| 2016/0151829 A1* | 6/2016 | Propheter-Hinckley | B28B 1/001 164/529 |
| 2016/0160952 A1* | 6/2016 | Schaedler | B60N 3/048 188/377 |
| 2016/0245710 A1* | 8/2016 | Twelves, Jr. | F16F 1/025 |
| 2017/0050677 A1 | 2/2017 | Czinger et al. | |
| 2017/0226674 A1 | 8/2017 | Jerez | |
| 2018/0001944 A1* | 1/2018 | Causley | B62D 37/02 |
| 2018/0229443 A1* | 8/2018 | Pham | B29D 99/0014 |
| 2019/0017388 A1* | 1/2019 | El-Wardany | F01D 5/183 |
| 2019/0061930 A1* | 2/2019 | Hampton | B29C 73/04 |

OTHER PUBLICATIONS

Sunanda et al., Analysis of NACA 2412 for Automobile Rear Spoiler Using Composite Material, Jan. 2013. International Journal of Emerging Technology and Advanced Engineering (Year: 2013).*

\* cited by examiner

ARTICLE WITH SOLID, LATTICE, AND HOLLOW SUB-REGIONS

BACKGROUND

Many types of articles are fabricated by casting or molding. Typically, these processes limit article design. For instance, a molded article cannot have a geometry that does not enable it to be ejected from a mold, and a cast article cannot have a geometry that produces excessive defects. As a result, the design of such articles is a compromise between performance on one hand, and manufacturability on the other hand. Practically, neither manufacturing nor performance can be optimized because of this interdependency, and sacrifices in each must be made.

SUMMARY

An article according to an example of the present disclosure includes a body that has a solid shell that encloses an interior region. The interior region has a solid sub-region, a lattice sub-region, and a hollow sub-region that are exclusive of each other.

An article according to an example of the present disclosure includes a body that has a first section and a second section. The second section projects from the first section. There are main working load paths between the first section and the second section, and lower, secondary working load paths through at least the second section. The body includes a solid shell that encloses an interior region. The interior region has one or more solid sub-regions, one or more lattice sub-regions, and one or more hollow sub-regions. The interior region along the main working load paths is formed of the one or more solid sub-regions. The interior region along the secondary load paths is formed of the one or more lattice sub-regions. A remainder of the interior region that is not along the main working load paths or the secondary working load paths is formed of the one or more hollow regions.

An article according to another example disclosed herein includes a spoiler body that has a spoiler mount section and a support section. The spoiler mount section is cantilevered at an acute angle from the support section. There are main working load paths between the spoiler mount section and the support section, and lower, secondary working load paths through at least the support section. The body includes a solid shell that encloses an interior region. The interior region has one or more solid sub-regions, one or more lattice sub-regions, and one or more hollow sub-regions. The interior region along the main working load paths is formed of the one or more solid sub-regions. The interior region along the secondary load paths is formed of the one or more lattice sub-regions. A remainder of the interior region that is not along the main working load paths or the secondary working load paths is formed of the one or more hollow regions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
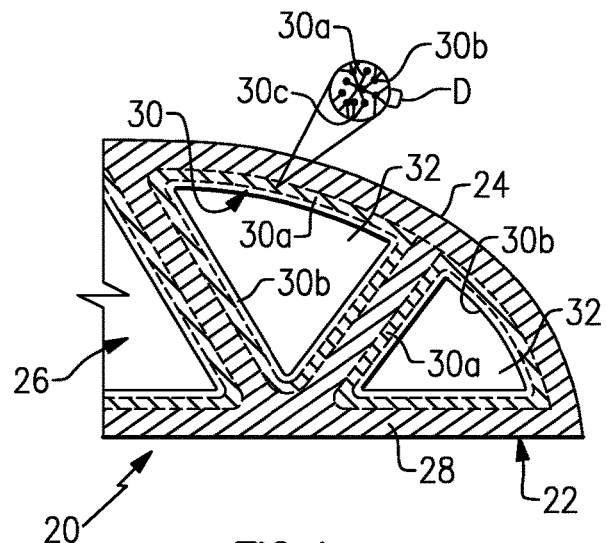
FIG. 1 illustrates an example article that has solid, lattice, and hollow sub-regions within a solid shell.

FIG. 1 schematically illustrates a representative portion of an article 20. As an example, the article 20 is a re-design of an existing article in order to reduce weight, yet substantially maintain exterior geometry and structural integrity. However, it will be appreciated that the article 20 and examples herein are also applicable completely new designs or other partial re-designs.

The article 20 includes a body 22 that is formed of a solid shell 24 that encloses an interior region 26. The solid shell 24 refers to an exterior thin wall and/or region that extends around the interior region 26.

The interior region 26 is divided into three sub-regions, including a solid sub-region 28, a lattice sub-region 30 (which is further divided into regions of trusses 30*a* and nodes 30*b*), and a hollow sub-region 32 (collectively "sub-regions 28/30/32"). The sub-regions 28/30/32 are exclusive of each other in that, within the peripheral boundary of each individual sub-region 28/30/32, there are no other of the sub-regions 28/30/32. Thus, the principal structure of the sub-region is determinative of its type. For instance, a lattice sub-region with trusses is not also a solid sub-region merely because it has "solid" trusses. If the trusses are the principal structure, the sub-region is a lattice sub-region, to the exclusion of the other types of sub-regions. Likewise, a sub-region that is principally solid is exclusively a solid sub-region, and a sub-region that is principally empty is exclusively a hollow sub-region.

As the name indicates, the solid sub-region 28 is solid and is thus filled with material. It is to be appreciated that the material may contain minor or incidental unintended porosity and still be considered solid. In contrast, the hollow sub-region 32 is empty, containing no material.

As the name also indicates, the lattice sub-region 30 includes a lattice. As shown in the FIG. 1 inset, the lattice is composed of trusses 30*a* that meet at nodes 30*b*. The trusses 30*a* are provided in a geometric or non-random configuration and form lattice "cells" 30*c*. A lattice cell 30*c* is a unit bound on all sides, except at the solid shell 24, by trusses 30*a*. In some examples, the lattice cells 30*c* are provided in a repeating pattern and may thus have a common size and shape, although some lattice cells 30*c* that are near the boundary of the lattice sub-region 30 or solid shell 24 may be irregular. The interiors of the lattice cells 30*c* are open, but as indicated above do not constitute hollow sub-regions since they are within the peripheral boundary of the lattice sub-region 30.

The article 20 may be fabricated using an additive manufacturing process, such as selective laser sintering. For instance, using additive manufacturing, the body 22 can be fabricated as a one-piece body, as opposed to having multiple initially separate body pieces that are then bonded or fastened together. Additive manufacturing is generally known and thus not discussed here in detail, except to note that it involves the sintering or fusing of powder particles together in the shape of the article being built. In this regard, the article 20 may be formed with an egress hole at an appropriate location to permit removal of unfused powder, uncured resin, and/or support material during the build process. If desired, additional structures can be included within the interior region 26 to guide powder removal, such as tubular structures.

Additionally, the size of the lattice cells 30c may be selected in coordination with the additive manufacturing process such that the lattice cells 30c have a maximum dimension, represented at D, that is larger than the mesh size of the powder particles. This allows unfused particles to be removed through the lattice sub-region 30. In one example, the maximum dimension D is from 4 millimeters to 10 millimeters. At least for some geometries, the minimum size of the lattice cells 30c may thus be limited by the size of the powder selected for fabrication.

The size of the lattice cells 30c may also be used to establish a "resolution" for distinguishing the sub-regions 28/30/32. For instance, the size of the lattice cells 30c may be used to establish the minimum size that a solid portion or an empty portion must be in order to be considered a solid sub-region or hollow sub-region, respectively. For example, that minimum size may be greater than the maximum dimension D, or even greater than dimension D by some predefined multiplier that is greater than one and up to five. Otherwise, it may be difficult to resolve what a sub-region is and which sub-regions are which. In additional examples, to be considered a lattice sub-region, there must be multiple, adjacent lattice cells bound by trusses of substantially similar geometry. In further examples, the resolution for distinguishing the sub-regions 28/20/32 also relates to the resolution of the manufacturing process, and may, for instance, be based on the manufacturing resolution or set multiple thereof.

The article 20 may be formed of a material that is selected for its end-use. As an example, the article 20 is formed of a polymer composite or metal. Example polymer composites may include, but are not limited to, fiber-reinforced polymers. Example fiber-reinforced polymers may include engineered polymers that contain a thermoplastic matrix with short or long strand fibers dispersed there through. Example thermoplastics may include, but are not limited to, polyamides (e.g., polyamide-12, polyamide-11, polyamide-6, etc.), polystyrene, or polyurethane. Another example polymer is a UV (ultraviolet) curable resin. Example fibers may include, but are not limited to, glass fibers and carbon fibers. Metal powders may also be used. Example metals may include, but are not limited to, aluminum alloys, steel, or titanium alloys.

The sub-regions 20 may be selected during an engineering phase to be in particular locations in the interior region 26, to tailor the properties of the article 20. As an example, and as will be described in further examples below, the solid sub-region 28 may be located along the highest load path through the article 20, the lattice sub-region 30 may be located along a secondary load path, and the hollow sub-region 32 may be located where there are low or no loads. The secondary load path may be further divided among lattice sub-regions 30a/30b, where region 30a has higher density than region 30b. This facilitates using a minimal amount of material in the article 20 by locating more material where it is needed to bear high loads and less material where loads are lower. Given this description, one of ordinary skill in the art will be able to determine such paths experimentally, by computer modelling, or both. Although the relative volumetric amounts of the sub-regions 28/30/32 will be article-dependent, in one example each of the solid sub-region 28, the lattice sub-region 30, and the hollow sub-region 32 constitutes at least 20% by volume of the interior region 26. In a further example, the total hollow space, which includes the hollow-subregion 32 and void space in the lattice sub-region is at least 50% by volume of the interior region 26.

Figure 2:
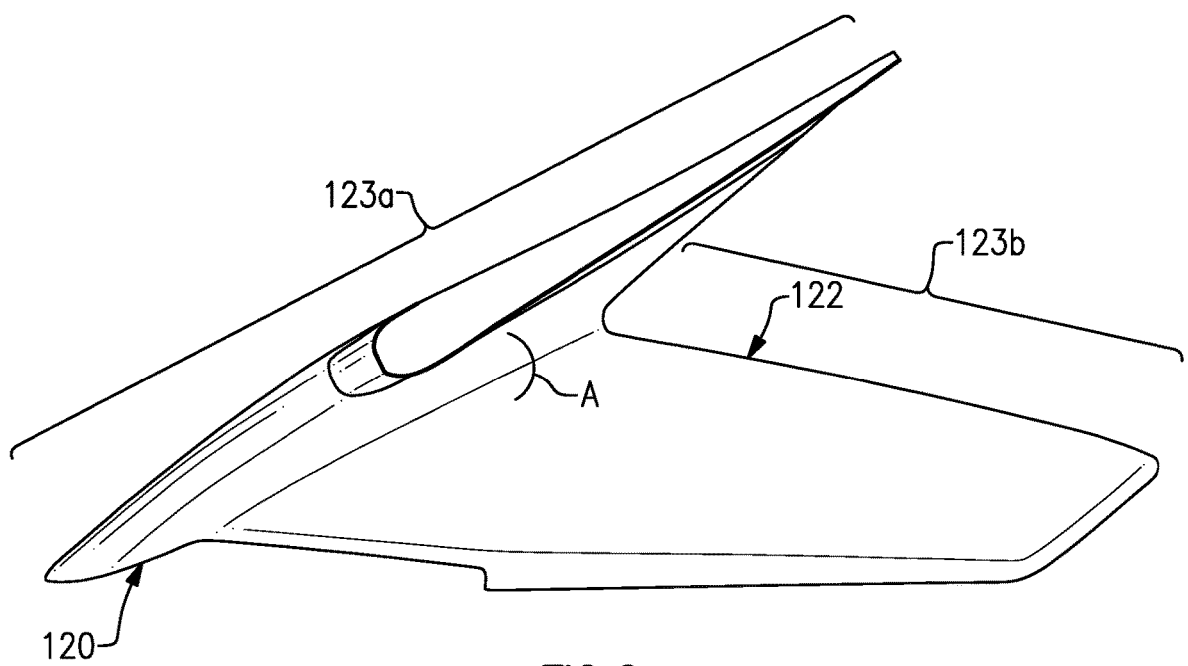
FIG. 2 illustrates another example article that has solid, lattice, and hollow sub-regions within a solid shell. The article in this example is a spoiler cap.

FIG. 2 shows an example of another article 120. In this disclosure, like reference numerals designate like elements where appropriate and reference numerals with the addition of one-hundred or multiples thereof designate modified elements that are understood to incorporate the same features and benefits of the corresponding elements. In this example, the article 120 is a spoiler cap, which may be used on a vehicle to support a spoiler. The spoiler cap includes a spoiler body 122 that has a spoiler mount (or first) section 123a and a support (or second) section 123b. The support section 123b projects from the spoiler mount section 123a. In this example, the spoiler mount section 123a is cantilevered at an acute angle, A, from the support section 123b. Like body 22, the spoiler body 122 may be of one-piece construction. In its full assembled position, the support section 123b may be rigidly secured to a vehicle, such as with fasteners.

Figure 3:
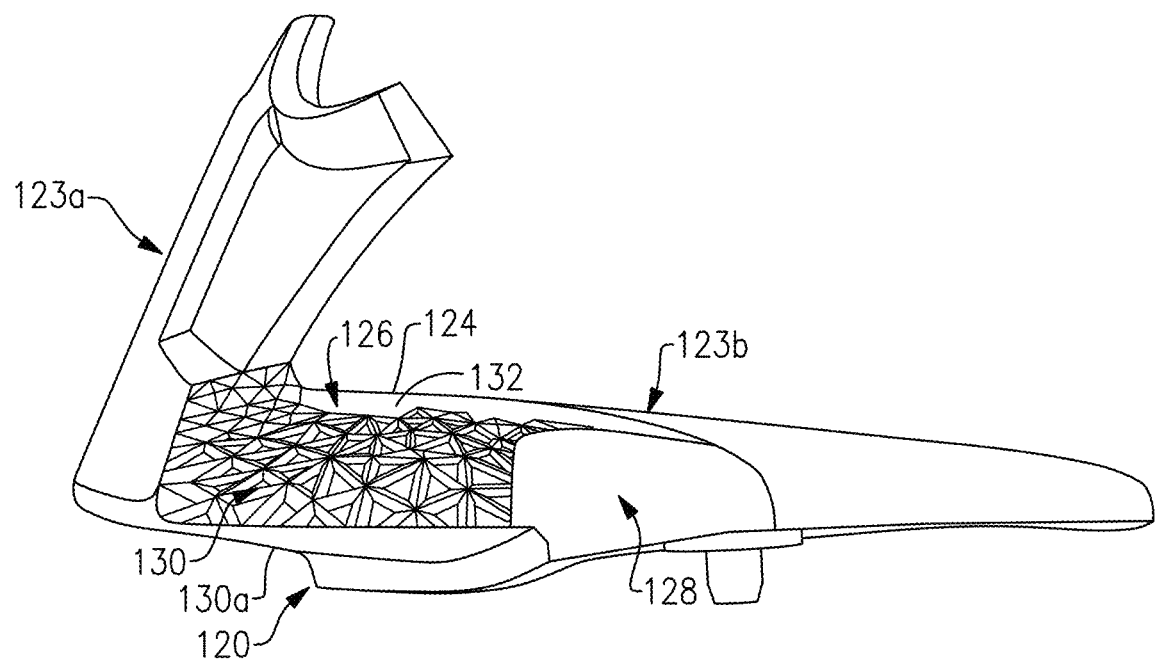
FIG. 3 illustrates a cutaway view of the article of FIG. 2.
Figure 4:
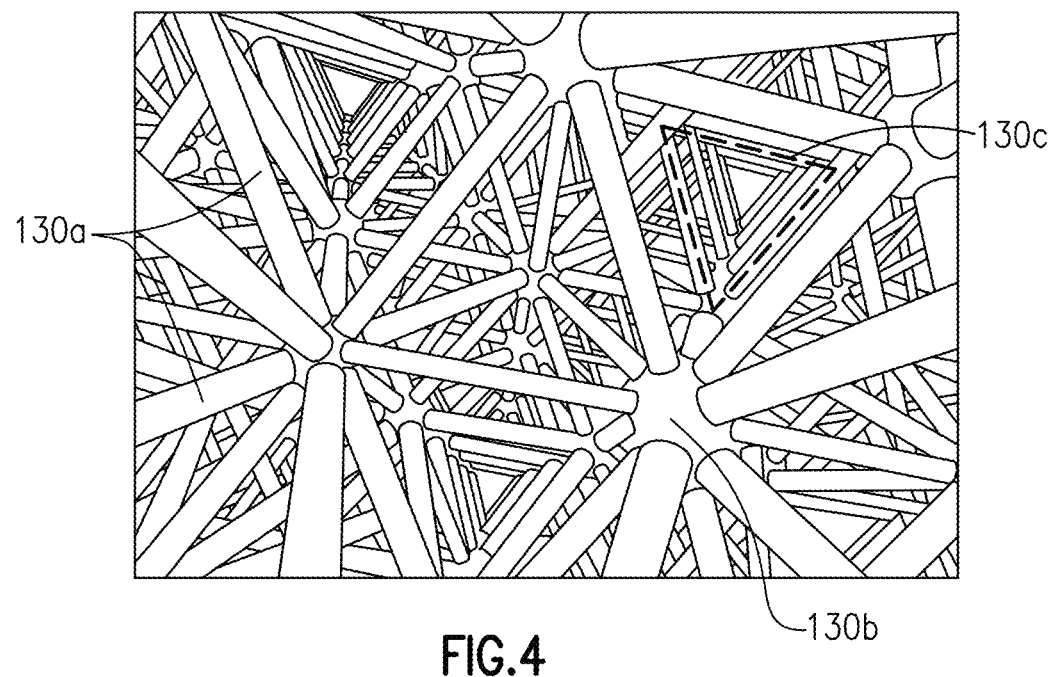
FIG. 4 illustrates an expanded view of a truss structure of a lattice sub-region.

FIG. 3 illustrates a cutaway view of the article 120, to expose solid shell 124 and interior region 126. The solid shell 124 encompasses both the spoiler mount section 123a and the support section 123b. The interior region 126 thus spans both sections 123a/123b. The article 120 includes one or more solid sub-regions 128, one or more lattice sub-regions 130, and one or more hollow sub-regions 132. Like lattice sub-region 30, the lattice sub-region 130 includes trusses 130a, nodes 130b, and lattice cells 130c, which are also shown in an expanded view in FIG. 4.

In this example, the trusses 130a are provided in 6-bar tetra repeat units, but other patterns can alternatively be used. The 6-bar tetra structure, however, can withstand compression, tension, and shear loads, has low weight compared to many other truss structures, and provides ample open area in its lattice cells 130a for powder removal. The lattice sub-region 130 may be further divided into pockets of varying lattice density. Lattice density refers to the ratio, by volume, between the trusses and open portions of a lattice repeat unit. For instance, the lattice density from pocket-to-pocket changes. Additionally or alternatively, the lattice density may transition from low-to-high, or vice versa, in accordance with higher and lower loads. Lattice density can be varied by altering the thickness of the trusses 130a. For instance, the trusses 130a may be varied from 1 or 2 millimeters to vary density.

Figure 5:
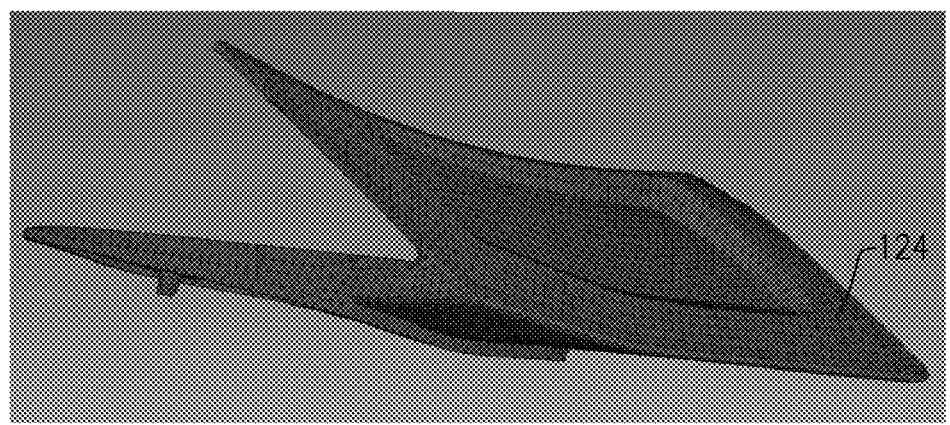
FIG. 5 illustrates a computer model of a solid shell of an article.
Figure 6A:
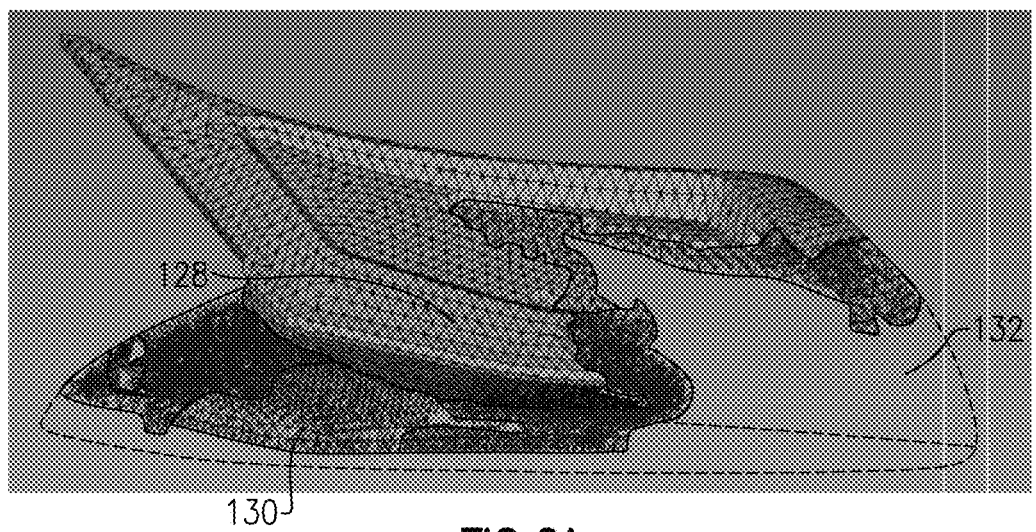
FIGS. 6A and 6B illustrate different angle view of only an interior of an article, without its solid shell.
Figure 6B:
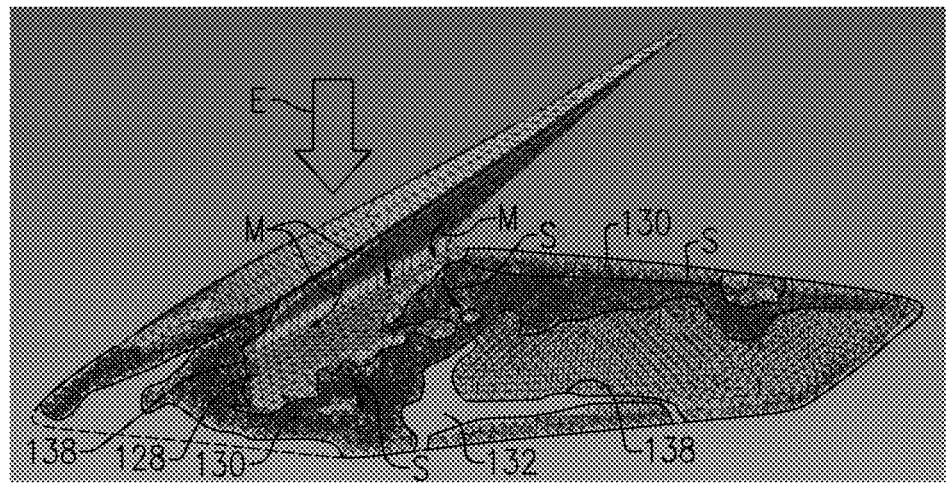

FIGS. 5, 6A, and 6B illustrate computer model views of various portions of the article 120. Specifically, FIG. 5 illustrates the solid shell 124, and FIGS. 6A and 6B illustrate the sub-regions 128/130/132 but in from different orientations.

During operation of the spoiler cap under its design conditions an external load, represented at E, is exerted on the spoiler mount section 123a. The external load E is reacted through the article 120 along working load paths to the vehicle to which the spoiler cap is secured. Such working load paths can be readily determined using known analysis techniques and computer modelling and are thus not discussed in detail here.

Through such analysis the working load paths can be classified by the load level. The load path that carries the highest load is the main load path. Practically, there may be several load paths that carry similarly high loads, which may be characterized as main load paths. As the load distributes, load paths that carry lower loads are secondary load paths. As shown in FIG. 6B, there are one or more main working load paths, represented at M, and one or more secondary working load paths, represented at S. The main working load paths M are between the spoiler mount section 123*a* and the support section 123*b* due to the angle A there between. The secondary working load paths S are through at least the support section 123*b*.

The sub-regions 128/130/132 are located according to the load paths M and S. Specifically, the interior region 126 along the main working load paths M is formed of the one or more solid sub-regions 128, the interior region 126 along the secondary load paths S is formed of the one or more lattice sub-regions 130, and a remainder of the interior region 126 that is not along the main working load paths M or the secondary working load paths S is formed of the one or more hollow regions 132. Thus, more material is used in locations where there are high loads and less material is used in locations where loads are lower. As a further example, the lattice density can also be varied such that higher densities are used in areas of higher loads and lower densities in areas with lower loads. This facilitates reduction in weight in comparison to a completely solid article of the same exterior geometry, while also maintaining structural integrity and performance requirements.

Fewer load paths or additional load paths can be identified for locations of the sub-regions 128/130/132. As will be appreciated, the load paths may be somewhat complex and also non-linear. In this regard, the additive manufacturing process provides free-form fabrication to precisely build even complex geometries of the sub-regions 128/130/132. For instance, the sub-regions 128/130/132 are irregularly-shaped such that the sub-regions 128/130/132 adjoin at irregular borders 138.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
    a spoiler body including,
        a solid shell that encloses an interior region, the interior region having a solid sub-region, a lattice sub-region, and a hollow sub-region that are exclusive of each other such that no portion of the solid sub-region, the lattice sub-region, or the hollow sub-region extends within a peripheral boundary of the others of the solid sub-region, the lattice sub-region, or the hollow sub-region,
    wherein the solid sub-region, the lattice sub-region, and the hollow sub-region adjoin each other at irregular borders.

2. The article as recited in claim 1, wherein the spoiler body is a one-piece body.

3. The article as recited in claim 1, wherein the spoiler body is formed of a polymer composite.

4. The article as recited in claim 1, wherein the lattice sub-region includes a geometric configuration of trusses that define lattice cells, and further wherein the trusses cross at nodes.

5. The article as recited in claim 4, wherein the lattice cells have a maximum dimension that is from 4 millimeters to 10 millimeters, and further wherein the hollow sub-region has a maximum dimension that is greater than 10 millimeters.

6. The article as recited in claim 4, wherein the trusses are provided in a pattern of 6-bar tetra repeating units.

7. The article as recited in claim 1, wherein each of the solid sub-region, the lattice sub-region, and the hollow sub-region is at least 20% by volume of the interior region, and a total of the hollow-sub-region and open space in the lattice sub-region is at least 50% by volume of the interior region.

8. The article as recited in claim 1, wherein each of the solid sub-region, the lattice sub-region, and the hollow sub-region is irregularly-shaped.

9. The article as recited in claim 1, wherein the interior region includes multiple regions of each of the solid sub-region, the lattice sub-region, and the hollow sub-region.

10. The article as recited in claim 1, wherein the lattice sub-region is divided into pockets of varying lattice density.

11. An article comprising:
    a spoiler body including a first section and a second section that projects from the first section, there being main working load paths between the first section and the second section, and lower, secondary working load paths through at least the second section,
    wherein the spoiler body includes a solid shell that encloses an interior region, the interior region having one or more solid sub-regions, one or more lattice sub-regions, and one or more hollow sub-regions, and
    wherein the interior region along the main working load paths is formed of the one or more solid sub-regions, the interior region along the secondary working load paths is formed of the one or more lattice sub-regions, and a remainder of the interior region that is not along the main working load paths or the secondary working load paths is formed of the one or more hollow regions
    wherein the one or more solid sub-regions, the one or more lattice sub-regions, and the one or more hollow sub-regions adjoin each other at irregular borders.

12. The article as recited in claim 11, wherein the spoiler body is a one-piece body and is formed of a polymer composite.

13. The article as recited in claim 11, wherein both of the first section and the second section include the one or more solid sub-regions, the one or more lattice sub-regions, and the one or more hollow sub-regions.

14. The article as recited in claim 11, wherein the one or more lattice sub-regions includes a geometric configuration of trusses that define lattice cells, and the lattice cells have a maximum dimension that is from 4 millimeters, and further wherein the one or more hollow sub-regions have a maximum dimension that is greater than 10 millimeters.

15. The article as recited in claim 11, wherein the one or more solid sub-regions, the one or more lattice sub-regions, and the one or more hollow sub-regions are, each collectively, at least 20% by volume of the interior region, and a total of the one or more hollow sub-regions and open space in the one or more lattice sub-region is at least 50% by volume of the interior region.

16. The article as recited in claim 11, wherein the one or more solid sub-regions, the one or more lattice sub-regions, and the one or more hollow sub-regions are exclusive of each other such that no portion of the one or more solid sub-regions, the one or more lattice sub-regions, or the one or more hollow sub-regions extends within a peripheral boundary of the others of the one or more solid sub-regions, the one or more lattice sub-regions, or the one or more hollow sub-regions.

17. An article comprising:
- a spoiler body including a spoiler mount section and a support section, the spoiler mount section being cantilevered at an acute angle from the support section, there being main working load paths between the spoiler mount section and the support section, and lower, secondary working load paths through at least the support section,
- wherein the spoiler body includes a solid shell that encloses an interior region, the interior region having two or more solid sub-regions, two or more lattice sub-regions, and two or more hollow sub-regions, and
- wherein the interior region along the main working load paths is formed of the two or more solid sub-regions, the interior region along the secondary working load paths is formed of the two or more lattice sub-regions, and a remainder of the interior region that is not along the main working load paths or the secondary working load paths is formed of the two or more hollow regions,
- where the two or more solid sub-regions, the two or more lattice sub-regions, and the two or more hollow sub-regions adjoin each other at irregular borders.

18. The article as recited in claim 17, wherein the spoiler body is a one-piece body, and further wherein both of the spoiler mount section and the support section include the two or more solid sub-regions, the two or more lattice sub-regions, and the two or more hollow sub-regions.

19. The article as recited in claim 18, wherein the two or more solid sub-regions, the two or more lattice sub-regions, and the two or more hollow sub-regions are, each collectively, at least 20% by volume of the interior region, and a total of the two or more hollow sub-regions and open space in the two or more lattice sub-regions is at least 50% by volume of the interior region.

20. The article as recited in claim 17, wherein the two or more solid sub-regions, the two or more lattice sub-regions, and the two or more hollow sub-regions are exclusive of each other such that no portion of the two or more solid sub-regions, the two or more lattice sub-regions, or the two or more hollow sub-regions extends within a peripheral boundary of the others of the two or more solid sub-regions, the two or more lattice sub-regions, or the two or more hollow sub-regions.

\* \* \* \* \*

UNITED STATES PATENT AND TRADEMARK OFFICE
CERTIFICATE OF CORRECTION

Page 1 of 1

PATENT NO. : 10,906,236 B2
APPLICATION NO. : 15/879852
DATED : February 2, 2021
INVENTOR(S) : Hongyi Xu et al.

It is certified that error appears in the above-identified patent and that said Letters Patent is hereby corrected as shown below:

In the Claims

In Claim 14, Column 6, Line 58; replace "from 4 millimeters, and" with --from 4 millimeters to 10 millimeters, and--

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*